US008914812B2

(12) United States Patent  
Kreuzenstein et al.

(10) Patent No.: US 8,914,812 B2
(45) Date of Patent: Dec. 16, 2014

(54) CONTROLLING OPERATIONS ACCORDING TO ANOTHER SYSTEM'S ARCHITECTURE

(75) Inventors: Ronald K. Kreuzenstein, Sunnyvale, CA (US); Elizabeth A. Moore, Sunnyvale, CA (US); Alberto Poggesi, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 12/684,325

(22) Filed: Jan. 8, 2010

(65) Prior Publication Data

US 2011/0173640 A1 Jul. 14, 2011

(51) Int. Cl.
*G06F 3/00* (2006.01)
*G06F 13/24* (2006.01)

(52) U.S. Cl.
CPC .................................. *G06F 13/24* (2013.01)
USPC ............ 719/328; 719/311; 719/318; 719/321

(58) Field of Classification Search
None
See application file for complete search history.

(56) References Cited

U.S. PATENT DOCUMENTS

| 6,530,078 | B1* | 3/2003 | Shmid et al. ................. 717/138 |
| 6,601,034 | B1 | 7/2003 | Honarvar et al. |
| 7,062,757 | B2 | 6/2006 | Honarvar et al. |
| 7,203,946 | B2 | 4/2007 | Johnson et al. |
| 7,269,833 | B2 | 9/2007 | Kushnirskiy |
| 7,437,490 | B2* | 10/2008 | Casper et al. ................. 710/36 |
| 2003/0004972 | A1* | 1/2003 | Winokur ....................... 707/200 |
| 2004/0177243 | A1* | 9/2004 | Worley, Jr. ........................ 713/2 |
| 2005/0049849 | A1* | 3/2005 | Re et al. ........................ 703/26 |
| 2005/0078694 | A1* | 4/2005 | Oner ............................ 370/412 |
| 2006/0047677 | A1* | 3/2006 | Lin et al. ....................... 707/101 |
| 2006/0282564 | A1* | 12/2006 | Casper et al. .................. 710/39 |

OTHER PUBLICATIONS

Microsoft Computer Dictionary, Mar. 15, 2002, Publish Micrsoft Press; ISBN 978-0-7356-1495-6.*
http://web.archive.org/web/20091120101632/http://en.wikipedia.org/wiki/Application_Programming_Interface; Nov. 20, 2009.*
Emmerich, W. et al., "The Impact of Research on Middleware Technology," ACM SIGOPS Operating System Review, vol. 41, Issue 1, Jan. 2007, pp. 89-112.
Lafitte, Jean-Louis, "40 Years Later . . . A New Engine to Handle an Operating System Infrastructure," ACM SIGARCH Computer Architecture News, vol. 32, No. 4, Sep. 2004, pp. 15-22.
"z/Architecture® Principles of Operation," IBM Publication No. SA22-7832-07, Feb. 2009.

* cited by examiner

*Primary Examiner* — Emerson Puente
*Assistant Examiner* — Dong Kim
(74) *Attorney, Agent, or Firm* — Steven Chiu, Esq.; Blanche E. Schiller, Esq.; Heslin Rothenberg Farley & Mesiti P.C.

(57) ABSTRACT

An I/O device operating according to a native computer architecture is accessed by a primary computer system operating according to a primary computer architecture. An application program of the primary computer system requests an I/O operation to access the I/O device. To facilitate this access, an application program interface formed of primary instructions for execution by the primary processor processes the I/O operation to provide an I/O request and to receive an interrupt in response to completion of the access. A thread is formed of primary instructions for execution by the primary processor for receiving the interrupt from the application program interface. A subsystem operates in response to the I/O request to access the I/O device and to provide the interrupt.

21 Claims, 7 Drawing Sheets

US 8,914,812 B2

CONTROLLING OPERATIONS ACCORDING TO ANOTHER SYSTEM'S ARCHITECTURE

BACKGROUND

The present invention relates to computer systems and particularly to execution of operations, such as I/O (input/output) operations, for one computer architecture on another computer architecture.

In some computer systems, operations performed on one architecture, such as non-mainframe I/O operations, cannot directly access I/O devices operating according to another architecture, such as mainframe architectures. In such circumstances, the one architecture and the other architecture are not inter-operable. In such systems, access to the data on the I/O devices is provided indirectly for the non-mainframe systems.

In one example, indirect access to the data is provided via a network using Ethernet, TCP/IP, and a network file system (NFS). Because the NFS server is implemented on the mainframe, the mainframe's performance suffers when a non-mainframe platform makes an access to the data. This is because the mainframe has to perform a direct access to the device on behalf of the non-mainframe system and communicate the data to or from the non-mainframe system. Furthermore, both mainframe and non-mainframe suffer network processing overhead.

In another example, an intermediary device is used that supports the ESCON (Enterprise Systems Connection) or FICON (Fiber Connection) protocol (offered by International Business Machines Corporation) on the mainframe side and a network interface on the non-mainframe side. The intermediary device appears to be a direct access storage device (DASD) or channel-to-channel (CTC) control unit to the mainframe. It relays the information transmitted on the mainframe side to the non-mainframe side and vice versa. Use of the ESCON or FICON interface results in lower processing burden on the mainframe than a network attachment on the mainframe. However, the mainframe is still required to make the storage device accesses on behalf of the non-mainframe platform, and the non-mainframe system suffers network processing overhead. Furthermore, the intermediary device adds cost to the solution.

BRIEF SUMMARY

In order to have greater inter-operability of computer systems of different architectures and particularly to have inter-operability of I/O operations among such computer systems, a facility is provided to improve operability of systems of multiple computer architectures. In one example, a facility is provided that enables direct access by one computer architecture to devices operating according to another computer architecture.

The shortcomings of the prior art are overcome and additional advantages are provided through the provision of a computer program product for facilitating access to an input/output (I/O) device of a computing environment. The computer program product comprises a storage medium readable by a processing circuit and storing instructions for execution by the processing circuit for performing a method. The method includes, for instance, processing, by an application program interface executing on a processor operating according to a first architecture, an I/O operation to access an I/O device operating according to a second architecture, the second architecture different from the first architecture, the processing providing an I/O request; and accessing, by a subsystem coupled to the application program interface, the I/O device, in response to the I/O request, and providing to the application program interface an interrupt to indicate completion of the I/O operation.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
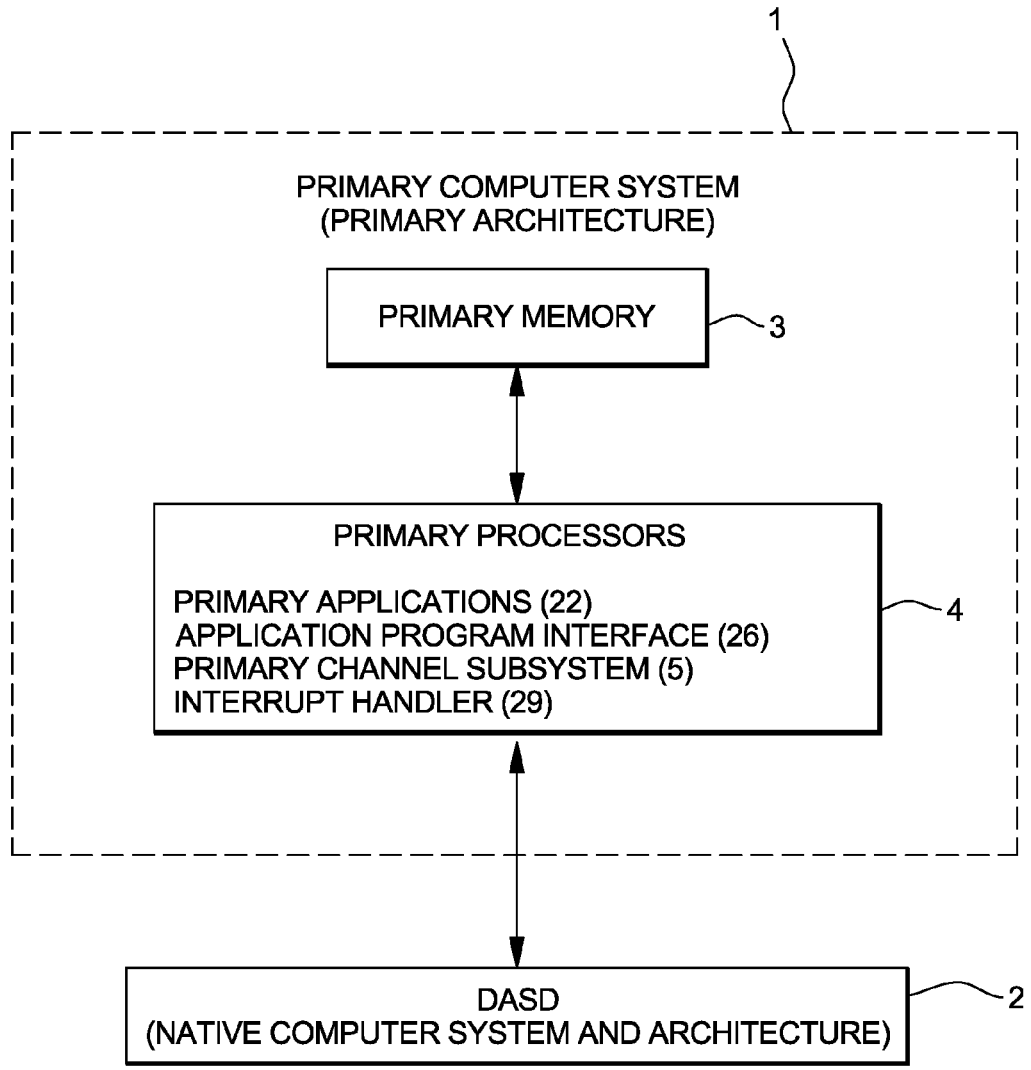
FIG. 1 depicts one example of a block diagram of a primary computer system operating according to a primary architecture connected to a direct access storage device (DASD) operating according to the requirements of a native computer system, in accordance with an aspect of the present invention.

In accordance with an aspect of the present invention, a processor, such as a non-mainframe processor operating according to one architecture, utilizes an application program interface to directly access data on an input/output (I/O) device operating according to another architecture different than the one architecture. As one example, the other architecture is an architecture of a mainframe computer system.

One example of a mainframe computer architecture is the z/Architecture®, offered by International Business Machines Corporation (IBM®). One embodiment of the z/Architecture® is described in an IBM® publication entitled, "z/Architecture® Principles of Operation," IBM Publication No. SA22-7832-07, February 2009, which is hereby incorporated herein by reference in its entirety. This architecture and other mainframe architectures are in contrast to non-mainframe architectures, such as an Intel® Itanium architecture. In one example, computer systems running, for instance, Windows®, Linux, Unix, and other operating systems execute on the Intel® architecture. IBM®, z/Architecture® and z/OS® (below) are registered trademarks of International Business Machines Corporation, Armonk, N.Y. Windows® is a registered trademark of Microsoft Corporation, Redmond, Wash. Intel® is a registered trademark of Intel Corporation. Other names used herein may be registered trademarks, trademarks or product names of International Business Machines Corporation or other companies.

In one embodiment, the z/Architecture® is a 64-bit computing architecture, which retains backward compatibility with previous 31-bit architectures (e.g., S/390®) and 24-bit architectures (S/370) offered by International Business Machines Corporation. As an example, a processor (i.e., a central processing unit (CPU)) based on the z/Architecture® executes an operating system, such as the z/OS® operating system offered by International Business Machines Corporation or other operating systems. With such systems, I/O operations are complex and logic is applied to the data to convert formats and provide other similar functions. In one embodiment, the processor creates channel programs to enable a channel subsystem to handle I/O operations. The channel subsystem upon receiving a channel program then executes without assistance from the processor (CPU). When execution is complete or when there is an error, the channel subsystem communicates back to the CPU using an interrupt. In one example, the channel subsystem is a channel subsystem on mainframe systems offered by International Business Machines Corporation. The channel subsystem directs the flow of information between I/O devices and main storage and uses one or more channel paths (i.e., channels) as the communication link to or from I/O devices. The channel subsystem performs path-management by testing for channel-path availability and by choosing an available channel path.

Computer systems that use channels for I/O may have special hardware components that handle input/output operations in their entirety independently of the systems' CPU(s). The CPU of a system that uses channel I/O typically has a machine instruction in its repertoire for input and output; this instruction is used to pass input/output commands to the specialized I/O hardware in the form of channel programs. I/O operations thereafter proceed without intervention from the CPU until an event requiring notification of the operating system occurs, at which point the I/O hardware signals an interrupt to the CPU.

A channel is an independent hardware component that coordinates I/O operations for I/O controllers or devices. A channel is an entity that handles details of I/O operations after being given a list of I/O operations to execute in the form of a channel program. The IBM® channel subsystem communicates with I/O devices over channel paths connected between the channel subsystem and I/O devices or their control units. Each channel may support one or more I/O controllers and/or I/O devices. Typically, there is one physical interface per channel.

Channel programs contain commands for the channel and the various controllers and devices to which the channel connects. The operating system prepares a list of I/O commands and then executes a single I/O machine instruction to initiate the channel program. The channel thereafter assumes control of the I/O operations until they are completed.

The channel programs impart flexibility that frees CPUs from the overhead of starting, monitoring, and managing individual I/O operations.

In one embodiment of mainframe computer systems, CPUs are one of several powerful hardware processors that work in parallel. In addition to CPUs, I/O processors handle I/O operations and are connected to channels that are dedicated to input and output operations. There may be several CPUs and several I/O processors. The z/Architecture® is intended to optimize input/output performance without degrading CPU performance. Many mainframe applications are heavily I/O-intensive business applications and the z/Architecture® helps provide high levels of throughput that distinguish mainframes from other types of computers.

In one example, a channel is a data connection in a hierarchically organized I/O subsystem. Channels either connect to channel interfaces on devices, such as direct access storage devices (DASDs), terminal concentrators and so forth (for example, ESCON, FICON), or they connect to a network (for example, OSA—Open Systems Adapter). Channels are controlled by channel command words (CCWs), where a channel command word (CCW) is an instruction for a specialized I/O channel processor. The channel command word is used to initiate an I/O operation on a channel-attached device.

CCWs are organized into channel programs. A channel program is a sequence of one or more I/O instructions (that is, one or more CCWs) executed by the input/output channel processor. The operating system signals the I/O channel processor to begin executing the channel program with, for instance, a SSCH (Start Subchannel) machine instruction. The CPU processor then is not burdened with I/O operations and proceeds with non-I/O instruction operations until interrupted by an interrupt from the I/O operation. When the I/O operations are complete, the channel posts an interrupt.

When I/O operations are initiated by the machine instruction Start Subchannel, this instruction passes the contents of an operation-request block (ORB) to a subchannel. A subchannel provides the logical appearance of a device and includes the information for sustaining an I/O operation. The contents of the ORB include, for instance, the subchannel key, the address of the first CCW to be executed, and a specification of the format of the CCWs. The CCW specifies the command to be executed and the storage area, if any, to be used. The execution of Start Subchannel, is complete when the ORB contents have been passed to the subchannel and the results of the execution of the instruction are indicated by the condition code set in the program-status word (PSW). The channel subsystem fetches the first CCW and decodes it according to the format specified in the ORB.

As used herein, a computer system, such as a mainframe based on an architecture, such as the z/Architecture® of IBM®, is referred to as a native system. A computer system, such as a non-mainframe, that is of a different architecture, which is not inter-operable with the native architecture is referred to as a primary computer system. Further details regarding a primary computer system are described with reference to FIG. 1.

In FIG. 1, a primary computer system 1 is a system running according to a primary architecture. The computer system 1 includes a primary memory 3 and one or more primary processors 4. The primary computer system is coupled to an I/O device, such as a direct access storage device (DASD) 2 (or other peripheral device) that operates according to the requirements of a native computer system. As one example, the native computer system is a mainframe computer system operating according to the z/Architecture® of International Business Machines Corporation and operating with an operating system, such as z/OS®, also of International Business Machines Corporation.

The primary computer system 1 operates with, for instance, a Linux, Windows®, Unix or other operating system and executes machine instructions on primary processors 4. The primary processors 4 are, for instance, Intel® x86_64s, Intel® Itaniums (IA-64s), PowerPCs or other processors. The primary architecture of primary computer system 1, in an example where primary processors 4 are Intel® Itaniums (IA-64s), is the Intel® Itanium architecture and in such example the primary architecture is distinguished from the IBM® z/Architecture®.

The primary processors 4 execute computer programs including primary applications 22, an application program interface 26, a primary channel subsystem 5, an interrupt handler 29, and other programs. These computer programs are executed using machine instructions of the primary processors 4.

The primary computer system 1 executes primary applications 22 having machine instructions that are executed by primary processors 4 according to the primary architecture. The primary applications in the primary architecture access the DASD 2, where the DASD 2 operates according to the requirements of a native computer system. The DASD 2 is accessed through, for instance, Primary Channel Subsystem (P-CSS) 5. In operation, in accordance with an aspect of the present invention, the primary processors 4 execute an application program interface 26 (API) in order to enable the computer system 1 to directly communicate with the DASD 2 or other peripheral devices. The application program interface 26 and the interrupt handler 29 are programs that execute machine instructions of the primary processors 4 under control of the primary architecture.

In accordance with an aspect of the present invention, the Primary Channel Subsystem 5 executed in the primary processors 4 of primary computer system 1 has a high level of compatibility with the channel functions and operations of the z/Architecture® so as to enable primary computer system 1 (a non-IBM® computer system operating according to a non-z/Architecture®) to communicate through channels with DASD 2. The communication is via, for instance API 26, and is carried out even though DASD 2 operates according to the requirements of a native computer system, such as an IBM® computer system operating according to the IBM® z/Architecture®. In the primary computer system 1, channels are controlled by channel command words (CCWs) where a channel command word (CCW) is an instruction for the primary channel subsystem 5 (P-CSS 5). The channel command word is used to initiate I/O operations on a channel-attached device, such as the DASD 2.

In the primary computer system 1, the CCWs are organized into channel programs. A channel program is a sequence of one or more I/O instructions (that is, one or more CCWs) executed by the primary channel subsystem 5. The primary operating system signals the primary channel subsystem 5 to begin executing the channel program with, for instance, a SSCH (Start Subchannel) API call. The primary processes are available to perform non-I/O instruction operations until interrupted by an interrupt from the I/O operation through the primary channel subsystem 5.

Figure 2:
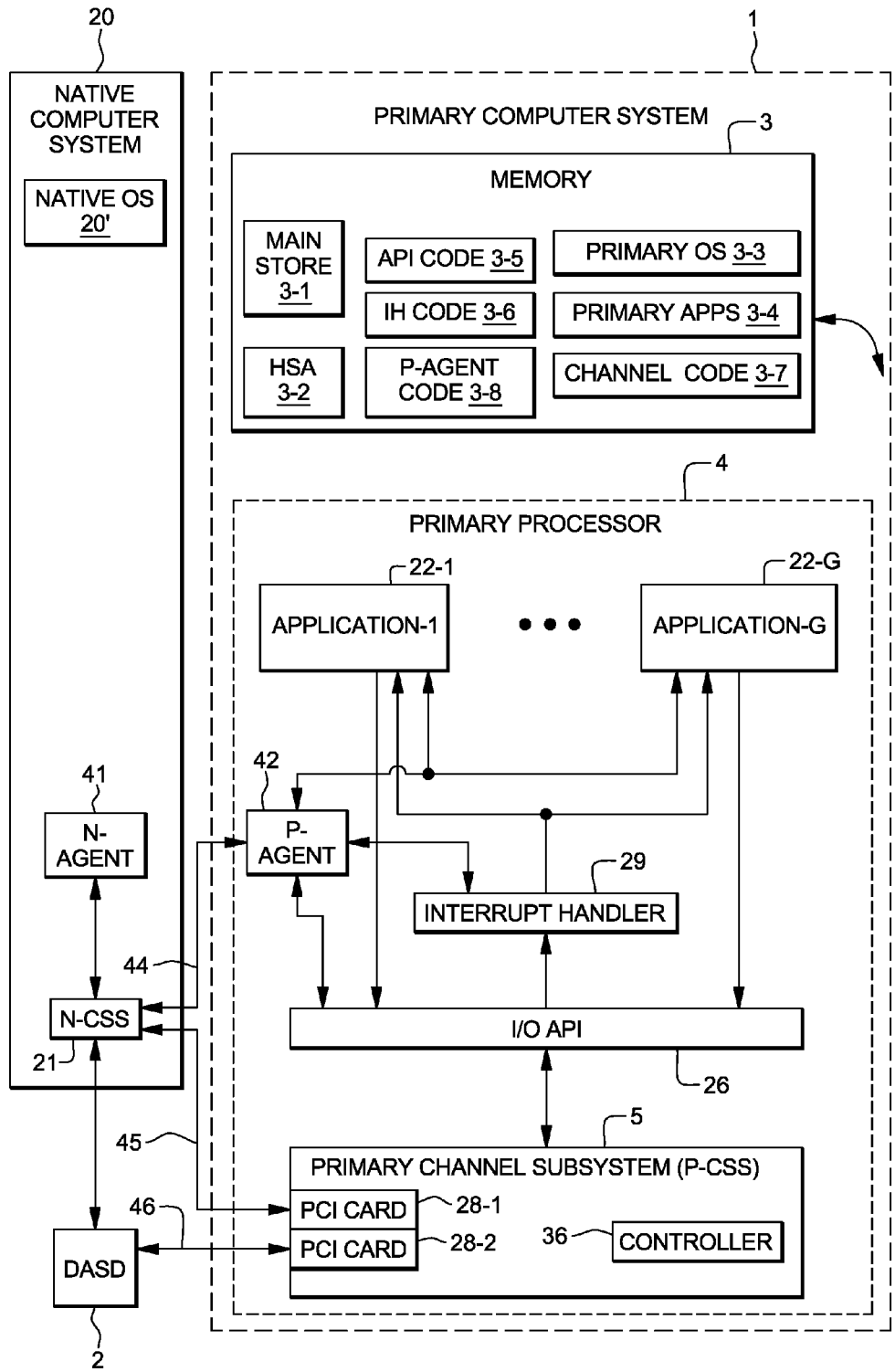
FIG. 2 depicts one example of a block diagram of the primary computer system of FIG. 1 operating according to a primary architecture and a native computer system operating according to a native architecture with both the primary computer system and the native computer system connected to the direct access storage device (DASD) of FIG. 1 operating according to the requirements of the native computer system, in accordance with an aspect of the present invention.

In FIG. 2, the primary computer system 1 is, for instance, a system running according to a primary architecture. The computer system 1 includes a primary memory 3 and one or more primary processors 4. Coupled thereto is a direct access storage device (DASD) 2 operating according to the requirements of a native computer system. For instance, the native computer system is a mainframe computer system operating according to the IBM® z/Architecture® and operating with an operating system, such as z/OS®.

The primary processors 4 execute computer programs including primary applications 22, an application program interface 26, a primary channel subsystem (P-CSS) 5, an interrupt handler 29, a P-Agent 42 and other programs. The P-Agent is used to facilitate communications between the primary channel subsystem and the native channel subsystem. These computer programs are executed using machine instructions of the primary processors 4.

The primary computer system 1 operates with, for instance, a Linux, Windows®, Unix or other operating system and executes machine instructions on primary processors 4. The primary processors 4 are, for instance, Intel® x86_64s, Intel® Itaniums (IA-64s), PowerPCs or other processors, as examples. The primary architecture of primary computer system 1, in an example where primary processors 4 are Intel® Itaniums (IA-64s), is the Intel® Itanium architecture and in such example the primary architecture is distinguished from the IBM® z/Architecture®.

In FIG. 2, a native computer system 20 is depicted, which is for instance, an IBM® mainframe computer system operating according to the z/Architecture® and operating with an IBM® operating system 20', such as z/OS®. The direct access storage device (DASD) 2 coupled to the native computer system (and the primary computer system) operates according to the requirements of the native computer system 20. The native computer system 20 includes a native channel subsystem (N-CSS) 21, which communicates with the DASD 2 using channel programs. The native channel programs are formed by the native computer system 20.

As depicted in FIG. 2, the primary computer system 1 executes primary applications 22, including applications 22-1, . . . , 22-G where G is any integer. The primary applications 22 are written to use machine instructions that execute in primary processors 4 according to the primary architecture. The primary applications 22 access the DASD 2. The DASD 2 is accessed through Primary Channel Subsystem (P-CSS) 5. In operation, the primary processors 4 execute an application program interface 26 (API) and an interrupt handler 29 in order to enable the primary computer system 1 to communicate with the DASD 2. The application program interface 26 and the interrupt handler 29 are computer programs that execute machine instructions of the primary processors 4 according to the primary architecture.

Memory 3 includes locations used in the general operation of the primary computer system 1 for executing the primary applications 22 and includes, for instance, locations for the channel operations of the I/O API 26, the primary channel subsystem 5, the interrupt handler 29 and the P-Agent 42. Specifically, memory 3 includes, for instance, mainstore locations 3-1, HSA (Hardware System Area) locations 3-2, primary OS locations 3-3, primary applications locations 3-4, API code locations 3-5, IH (Interrupt Handler) code locations 3-6, channel code locations 3-7, and P-Agent code locations 3-8, as examples.

Communication between the primary computer system 1 and the DASD 2 occurs in, for instance, three ways. In a first way, the I/O API 26 communicates directly with DASD 2 through PCI (Peripheral Component Interconnect) Card 28-2 and connection 46. In a second way, the I/O API 26 communicates with DASD 2 through PCI Card 28-1 over a channel-to-channel adapter connection 45 to a native agent, N-Agent 41, and the native channel subsystem, N-CSS 21. In a third way, the I/O API 26 communicates directly with DASD 2 over a TCP/IP connection 44 to the native channel subsystem 21 via P-Agent 42.

The I/O API 26 includes, for example, a set of library function calls that implement the equivalent functionality of mainframe I/O instructions (e.g., Start Subchannel, Test Subchannel, Store Subchannel, etc.). Communication between the P-Agent and the Primary Channel Subsystem 5 is facilitated using, for instance, request and interrupt queues in HSA 3-2 along with semaphores. Information is transferred using the queues. The semaphores are used to wake up the receiving process.

Further details of the primary computer system 1 are described with reference to FIG. 3. The primary applications 22, including applications 22-1, ..., 22-G, are coupled to the application program interface 26, and returns from the application program interface 26 are through interrupt handler 29 and interrupt code 31. The application program interface 26 accesses locations in HSA 3-2. The HSA 3-2 includes, for instance, subchannel control blocks 33, I/O interrupt queues 34 and a request queue 35. Information is transferred between HSA 3-2 and the primary channel subsystem 5. The primary channel subsystem 5 includes, for instance, controller code 36, other channel code 37, and PCI card code 28-2 connecting over physical connector 46 to DASD 2.

To send a request to the Primary Channel Subsystem 5 (P-CSS), an application or the P-Agent on behalf of the application calls functions in the I/O API 26. The functions do exception checking, copy necessary data to HSA 3-2 (for example, for the SSCH instruction, an ORB 32 is copied to the SCB 33), queues the request on the request queue and signals controller process 36 to wake up and handle the request, as examples. Some I/O API functions, such as StoreSubchannel, TestSubchannel, and TestPendingInterruption do not send a request to the controller 36.

To post an I/O interrupt from P-CSS 5, P-CSS 5 queues the interrupt on an I/O interrupt queue 34 and signals the interrupt handler 29. To receive an interrupt, interrupt handler 29 uses the API and calls, for instance, a TestPendingInterruption I/O API function. This function can be blocking, in which case it does not return until a signal is received from P-CSS 5; or non-blocking, in which case it returns immediately with an indication of whether an interrupt is present.

A channel report word (CRW) is used, in one example, to include information affecting the channel subsystem and CRWs are stored at the designated locations. To post a channel report word, P-CSS 5 enqueues the channel report word (CRW), queues an interrupt on an I/O machine check queue, and signals the interrupt handler 29. This signal is the same as for an I/O Interrupt, so when it occurs, TestPendingInterruption wakes up and returns 0, meaning there is no I/O Interrupt pending, in which case interrupt handler 29 calls StoreChannelReportWord for storing the CRW at a specified location. Alternatively, TestPendingInterruption also can return another code to indicate a CRW is pending.

Absolute addresses in the ORB, CCWs, IDAWs (Indirect Data Address Words—an absolute address designating a data area within system memory), and SCSW (subchannel status word) are used to point to locations in mainstore. For example, addresses in the ORB point to CCWs in mainstore, the CCWs point to the IDAWs, and the IDAWs or CCWs point to the data. The SCSW is returned by the TestSubchannel instruction. When a mainstore 3-1 address is provided, in one example, it has already been locked down by virtue of being pre-allocated so the address will not change during I/O. Primary hardware obtains output data from CPU caches if necessary when the ESCON or FICON PCI card fetches it using direct memory access (DMA).

Figure 3:
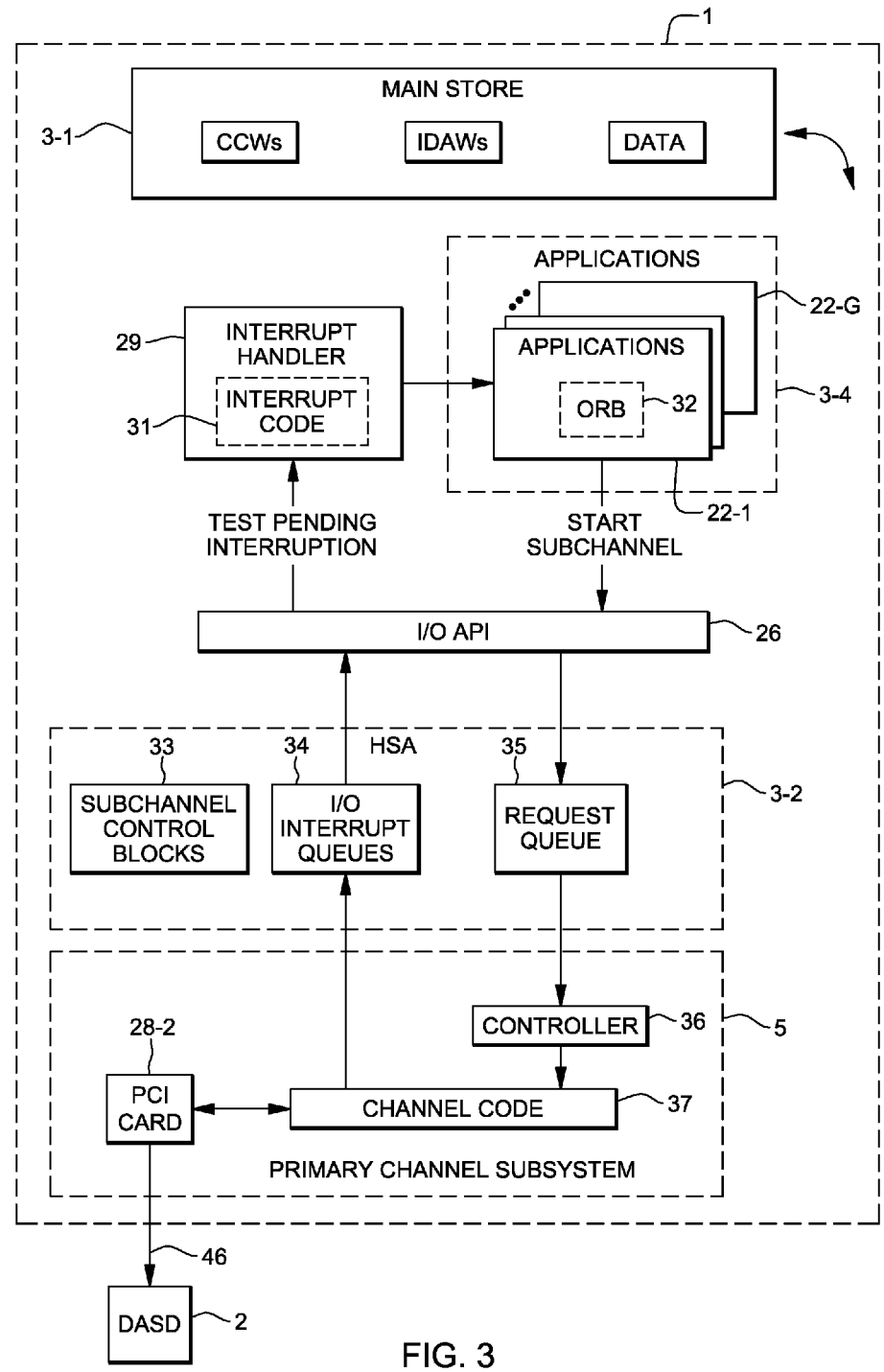
FIG. 3 depicts one example of a block diagram of further details of the primary computer system of FIG. 1 and FIG. 2, in accordance with an aspect of the present invention.

In one embodiment referring to FIGS. 2 & 3, an application 22 executing on the primary operating system 3-3 desires access to data stored on a device 2 under the logical control of the controlling operating system 20' of native computer system 20. The controlling operating system 20' is responsible for ensuring the security and data integrity of the data residing on the storage device 2. When the application 22 is to read or write data to the device 2, messages are sent to the controlling operating system 20' to verify that the application 22 has permission to access the data. The location of the data on the device 2 is determined either directly by accessing the 'directory' (table of contents) of the device 2 or by sending a message to the controlling operating system 20' asking for the location. When the location is determined, the application 22 uses a connection 44, 45 or 46 to read from or write the data to the device 2. Messages are sent over connection 44 or 45 to the controlling operating system 20' if an update requires locks, catalog or directory updates or other services that the controlling operating system 20' is to provide. In some cases, the entire access may be performed with messages to the controlling operating system 20'. In other cases, data integrity and security can be assured using direct access 46 to the data 2. The N-Agent 41 on the controlling operating system 20' assists in coordinating the data access between the primary operating system 3-3 and the native operating system 20'. The P-Agent 42 on the primary computer system assists in coordinating the data access between the primary operating system 3-3 and the native operating system 20'.

The various components of the primary computer system 1 are started and/or initialized in the following sequence, as an example. Memory locations in memory 3 to be used for mainstore 3-1 and HSA 3-2 are reserved either before, or soon after the Primary OS 3-3 is started. In some implementations it is useful to do this with Extensible Firmware Interface (EFI) code, or equivalent, that runs as the hardware system is starting up, but before the Primary OS 3-3 starts. In other implementations, this operation is accomplished with device drivers that are installed into the Primary OS 3-3 or are installed shortly after the Primary OS 3-3 itself starts up. Thereafter, the primary channel subsystem 5 is started. Starting the primary channel subsystem 5 includes, for instance, allocating some portion of the previously-reserved memory for HSA 3-2, reading an I/O configuration file, and initializing the various data structures within HSA 3-2 based on the information therein. Also, processes implementing the channel code 3-7 and controller 36 are started at this time. Next, the interrupt handler 29 is started. Mainstore 3-1 will be allocated from the remaining previously reserved memory in memory 3 and cleared before use. Then, the P-Agent 42 is started. Finally, one or more application processes 22 are started. Since the I/O API 26 is typically implemented in a library, each process that needs to use the I/O API will call a function that initializes the I/O API for use by that process as that process starts up.

The channel subsystem 5 is implemented, for instance, using the primary computer system 1 operating under control of the primary operating system 3-3. It includes ESCON and/or FICON channels, as examples, which are provided via PCI (PCI-X or PCI-Express) cards, which are controlled by the primary channel subsystem 5. Application programs running on the primary system 1 use the I/O API 26, in one embodiment, to cause the channel subsystem 5 to access data stored on (or write data to) DASD 2 and other peripheral devices attached to the channels. The I/O API 26 can also be used to provide status of the channel subsystem 5 and perform various other functions.

The I/O API 26 supports different interactions including initiating an I/O operation, detecting the conclusion of an I/O operation and obtaining the status of an I/O operation. The I/O API 26 includes a library of programs that provide a new function, Init_IO_API_Access, used to initialize the I/O API 26, and includes functions equivalent to the functions performed by the I/O instructions in the z/Architecture® Principles of Operation. Examples of these functions are set forth below. The particular names of programs used herein are merely given for convenience and clarity and may have any other name that represents the corresponding functions of the programs, and equivalent programs thereto.

Example functions include:

| ID | Program Name |
|---|---|
| A. | Init_IO_API_Access |
| B. | CancelSubchannel |
| C. | ClearSubchannel |
| D. | HaltSubchannel |
| E. | ModifySubchannel |
| F. | ResetChannelPath |
| G. | ResumeSubchannel |
| H. | SetChannelMonitor |
| I. | StartSubchannel |
| J. | StoreChannelReportWord |
| K. | StoreSubchannel |
| L. | TestPendingInterruption |
| M. | TestSubchannel |

The API functions listed above differ from the similarly named instructions in the z/Architecture®, since the instructions in the z/Architecture® define the use of registers in the native z/Architecture® whereas the API programs are called by code, are independent of defined register locations and can have virtual address locations. Details of the functions are set forth below:

A. Init_IO_API_Access—This function is used to attach memory used by semaphores.
Prototype
int init_io_api_access (void);
Description
Attaches memory used by semaphores, which are used by I/O API functions. Is to be called during initialization by any process that uses the I/O API.
Arguments
None.
Return Values
Returns 0 if successful, non-zero otherwise.

B. CancelSubchannel—This function cancels a current start function, if any, at the designated subchannel.
Prototype
int CancelSubchannel (sid_t sid);
Arguments
This function takes one argument:
A 32-bit subsystem-identification word (0x0001xxxx, where xxxx is the subchannel number).
Return Values:
0 Function initiated
1 Status pending
2 Not Applicable
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

C. ClearSubchannel—This function clears the designated subchannel, terminates a current start or halt function, if any, at the designated subchannel, and signals the channel subsystem to asynchronously perform the clear function at the designated subchannel and the associated device.
Prototype
int ClearSubchannel (sid_t sid);
Arguments
This function takes one argument:
A 32-bit subsystem-identification word (0x0001xxxx, where xxxx is the subchannel number).
Return Values:
0 Function initiated
1 —
2 —
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

D. HaltSubchannel—This function terminates the current start function, if any, at the designated subchannel, and signals the channel subsystem to asynchronously perform the halt function at the designated subchannel and at the associated device.
Prototype
int HaltSubchannel (sid_t sid);
Arguments
This function takes one argument:
A 32-bit subsystem-identification word (0x0001xxxx, where xxxx is the subchannel number).
Return Values:
0 Function initiated
1 Status pending with other than intermediate status
2 Busy
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

E. ModifySubchannel—This function places the information contained in the Subchannel Information Block in the program-modifiable fields at the subchannel.
Prototype
int ModifySubchannel (sid_t sid, schib_t*schib);
Note:
The Subchannel Information Block (SCHIB) limit mode (LM) field should be zero. If set, an operand exception will be reported, in one example.
Arguments
This function takes two arguments:
A 32-bit subsystem-identification word (0x0001xxxx, where xxxx is the subchannel number).
A pointer to the place where the SCHIB is located. This is a virtual address in the calling application's address space.

Return Values:
0 Function completed
1 Status pending
2 Busy
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

F. ResetChannelPath—This function signals the channel path reset facility to perform a channel path reset function on the designated channel path.
Prototype
int ResetChannelPath (uint8_t chpid);
Arguments
This function takes one argument:
The Channel-Path Identifier.
Return Values:
0 Function completed
1—
2 Busy
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

G. ResumeSubchannel—This function signals the channel subsystem to perform the resume function at the designated subchannel.
Prototype
int ResumeSubchannel (sid_t sid);
Arguments
This function takes one argument:
A 32-bit subsystem-identification word (0x0001xxxx, where xxxx is the subchannel number).
Return Values:
0 Function initiated
1 Status pending
2 Busy
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

H. SetChannelMonitor—With this function, each of the measurement block update mode and device connect time measurement mode of the channel subsystem is made either active or inactive, depending on the designated values of the measurement mode control. If the measurement mode control for measurement block update is one, the measurement block origin and measurement block key are passed to the channel subsystem.
Prototype
int SetChannelMonitor (measurement_controls_t*measurement_controls);
Description
For getting I/O measurement information.
Arguments
This function takes one argument:
A pointer to the measurement controls structure, which contains the Measurement Block Origin and control fields.
Return Values
This function returns 0 if it completes successfully, without detecting any exception conditions.
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

I. StartSubchannel—This function signals the channel subsystem to asynchronously perform the start function for the associated device, and places the execution parameters that are contained in the designated ORB at the designated subchannel.
Prototype
int StartSubchannel (sid_t sid, orb_t*orb);
Description
The differences in the ORB are as follows:
The ORB Key field is normally set to zero.
The ORB A bit is normally zero (when no Set Address Limit is implemented). If set, it will cause an operand exception, in this example.
Arguments
This function takes two arguments:
A 32-bit subsystem-identification word (0x0001xxxx, where xxxx is the subchannel number).
A pointer to the ORB. This is a virtual address in the calling application's address space.
Return Values:
0 Function initiated
1 Status pending
2 Busy
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

J. StoreChannelReportWord—This function stores a CRW containing information affecting the channel subsystem at the designated location.
Prototype
int StoreChannelReportWord (crw_t*crw);
Description
For getting solicited response from ResetChannelPath and unsolicited channel report pending (CRP) conditions.
Arguments
This function takes one argument:
A pointer to the location where the channel report word should be stored.

Return Values:
The values returned by this function are as follows:
0 CRW stored
1 Zeros stored
2—
3—
In addition, since program interrupts are not taken in this environment, the following program exception conditions can be reported in the return code (negative value of the program-interruption codes):
−2 Privileged-operation
−5 Addressing
−6 Specification
−21 Operand (−0x0015)

K. StoreSubchannel—This function stores control and status information for the designated subchannel in the designated SCHIB.

Prototype
int StoreSubchannel (sid_t sid, schib_t*schib);
Arguments
This function takes two arguments:
A 32-bit subsystem-identification word (0x0001xxxx, where xxxx is the subchannel number).
A pointer to the place where the SCHIB should be returned. This is a virtual address in the calling application's address space.
Return Values:
The values returned by this function are as follows:
0 SCHIB stored
1—
2—
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

L. TestPendingInterruption—With this function, the I/O interruption code for a pending I/O interruption at a subchannel is stored at the location designated by the second operand address, and the pending I/O interruption request is cleared.

Prototype

```
int TestPendingInterruption ( interrupt_code_t
*interrupt_code, uint32_t subclass_mask, int timeout );
```

Description
This function has a blocking option that waits for a semaphore to indicate that an interrupt has been posted. Unexpected return codes from the semaphore wait are handled within this function.
Arguments
This function takes three arguments:
A pointer to the place where the interruption code should be returned. This is a virtual address in the calling application's address space.
A 32-bit value containing 8 subclass-mask bits in the same format as the control register 6 in ESA/390 mode. This function returns a value of 1 when an interrupt is pending for a subclass that is included in the subclass mask argument. The most-significant bit corresponds to ISC 0 (bit 0 in IBM numbering, bit 31 in Intel numbering) with bits to the right corresponding to higher-numbered ISCs (bit 7 in IBM numbering, bit 24 in Intel numbering, corresponds to ISC 7). An integer specifying a timeout value in seconds. A zero value causes the function to return immediately. A non-zero value causes this function to block until an interruption becomes pending in one of the specified interrupt subclasses (i.e. when it can return a value of 1). If the function is blocked and the timeout value is positive, the function returns a value of 0, when the specified number of seconds has elapsed. Also, if some external condition (e.g. CRP machine check) occurs while the function is blocked, the function returns a value of 0. If the timeout value is negative, the function will not timeout.

Return Values:
The values returned by this function are as follows:
0 Interruption code not stored
1 Interruption code stored
2—
3—
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

M. TestSubchannel—This function stores control and status information for the subchannel in the designated IRB.

Prototype
int TestSubchannel (sid_t sid, irb_t*irb);
Arguments
This function takes three arguments:
A 32-bit subsystem-identification word (0x0001xxxx, where xxxx is the subchannel number).
A pointer to the place where the interrupt request block (IRB) should be returned. This is a virtual address in the calling application's address space.
Return Values:
The values returned by this function are as follows:
0 IRB stored; subchannel status pending
1 IRB stored; subchannel not status pending
2—
3 Not Operational
In addition, since program interrupts are not taken in this environment, the following program exception conditions can be reported in the return code (negative value of the program-interruption codes):
−2 Privileged-operation
−4 Protection
−5 Addressing
−6 Specification
−21 Operand (−0x0015)

In one embodiment, the channel subsystem utilizes certain control blocks and data structures in memory 3, such as the hardware system area (HSA 3-2) of memory 3. The channel subsystem also utilizes mainstore 3-1 area of memory 3. As one example, the mainstore 3-1 area is equivalent to the mainstore of an IBM®-compatible computer. Mainstore 3-1 is reserved at primary system startup time, and typically includes data, channel command words (CCWs) and indirect-data-address words (IDAWs).

The data structures in HSA 3-2 are used, as an example, for communication between the functions of the API and the primary channel subsystem 5. HSA 3-2 includes, for instance, control blocks 33, such as subchannel control blocks (SCBs) that are equivalent to subchannels in a native IBM® computer system. Each SCB 33 includes, for instance, the state of an I/O device, such as DASD 2, from the perspective of the primary channel subsystem 5.

The CCWs and IDAWs in mainstore 3-1 control the primary channel subsystem 5 and an I/O device, such as DASD 2, during an I/O operation and specify mainstore 3-1 addresses at which data, IDAWs, and other CCWs are located. Prior to calling, for instance, the StartSubchannel API function, any CCWs and IDAWs needed to control the operation are stored in mainstore 3-1 by the calling application 22. Also, any data to be written to the DASD 2 device is set up in mainstore 3-1. Data areas are allocated in mainstore 3-1 for any data to be read from the DASD 2 device. The CCWs and IDAWs contain fields that point to the data areas.

In one embodiment, prior to calling a function that might cause an I/O interrupt, the primary computer system 1 initiates an interrupt handling process. In one example, a primary application 22 sets up a thread that calls the API's TestPendingInterruption (TPI) function. This function has, for instance, three parameters: a pointer to an interruption code structure, a subclass mask, and a timeout value. The interruption code structure is filled in when the TestPendingInterruption function returns an interrupt. The subclass mask is used to indicate which of a plurality (e.g., eight) of I/O interrupt queues to take interrupts from. A non-zero timeout value causes the TestPendingInterruption function to block until an interrupt is present on one of the queues. If no interrupt occurs prior to the timeout specified, the TestPendingInterruption function returns a value of zero. Normally, a TestPendingInterruption function call has been made and is blocked waiting for an interruption condition to occur.

One function that may cause an interrupt is the StartSubchannel function. This is described in further detail with reference to FIGS. 4A-4B, in which one embodiment of the logic for API 26 to initiate and complete a typical I/O operation is described. Although, in this particular example, the function being performed is the StartSubchannel function, in other examples, other functions may be performed. Reference is also made to FIGS. 2 and 3.

Figure 4A:
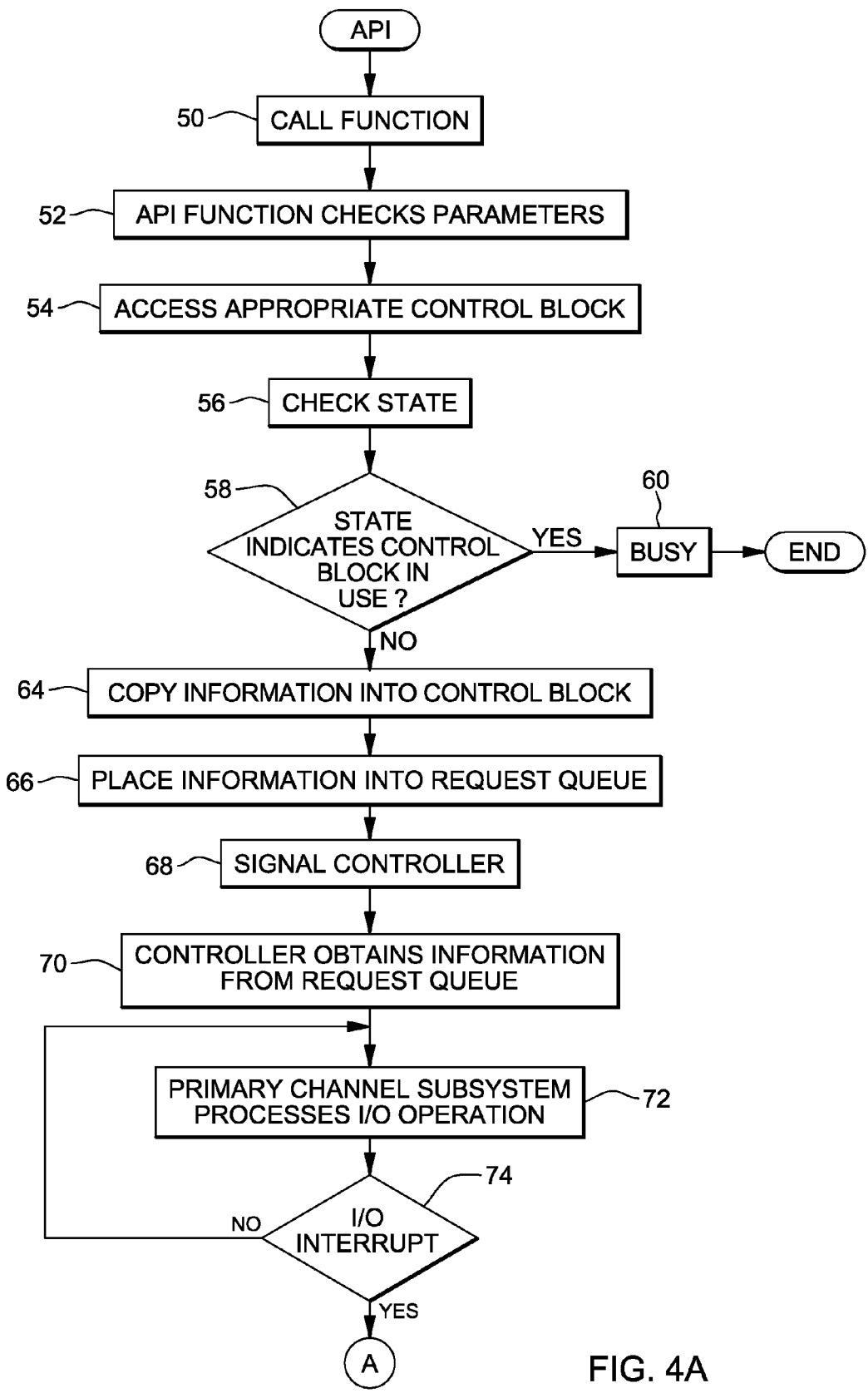
FIGS. 4A & 4B depict one embodiment of the logic of an application program interface (API) used to access an I/O device, in accordance with an aspect of the present invention.

Referring to FIG. 4A, the API function StartSubchannel is called by, for instance, an application executing within a primary processor, STEP 50. The function has two parameters, the subchannel number and a pointer to an operation-request-block (ORB) 32. The function checks these parameters, STEP 52, and assuming there is no problem, such as an operand exception, then accesses the appropriate SCB 33, based on the subchannel number, in HSA 3-2, STEP 54. (If a problem is detected, the API ends. For instance, if there is no subchannel corresponding to the subchannel number, the API function returns a not operational code.) The function checks the state of the SCB, STEP 56. If the state information in the SCB 33 indicates that the SCB is already in use while performing an I/O operation on a particular I/O device (such as DASD 2), INQUIRY 58, the StartSubchannel function returns a busy code, STEP 60. Note that other functions, such as HaltSubchannel, may also return this busy code.

In such a case, application 22 (or P-Agent 42) that called the StartSubchannel function is to keep track of the desired I/O operation and call the StartSubchannel function again when the SCB is no longer in use while performing an I/O operation. This operation is accomplished, in one embodiment, by simply delaying for some period of time, and then calling the StartSubchannel function again. Alternatively, more elaborate "queuing" mechanisms are implemented to keep track of multiple outstanding I/O operations on one or more devices 2. This operation allows the application 22 to perform other tasks until the SCB is available for another I/O operation. Once the SCB becomes available, the StartSubchannel may be re-issued. Similar mechanisms are used in the event that other resource limits are encountered. An example of one such resource limit occurs when there is no available mainstore to allocate for data areas or control structures associated with an I/O operation.

Returning to INQUIRY 58, if the state permits, the function copies information from, for instance, the ORB 32 into the SCB 33, STEP 64. Additionally, the StartSubchannel places the subchannel number and operation code into a request queue in HSA 3-2, STEP 66, and signals the controller process 36 of the primary channel subsystem 5, STEP 68. This signaling may be performed by various mechanisms, such as by semaphore, inter-process communication message, inter-processor interrupt, polling or other technique. In the example herein, a semaphore is used. In response to signaling the controller, an appropriate condition code (e.g., cc=0) is returned to the API, and the StartSubchannel function returns to the caller. Processing then continues in the primary channel subsystem 5.

Within the primary channel subsystem 5, the controller process 36 has a thread that is normally blocked waiting for the semaphore to be posted. The controller 36 senses that the semaphore has been posted, unblocks, and removes the subchannel number and operation code from the request queue, STEP 70. From this point, the primary channel subsystem 5 processes the I/O operation to the point of presenting an I/O interrupt, STEP 72. This process includes performing path selection and forwarding the information about the I/O operation to the selected channel path. The channel process passes the operation to, for instance, a channel card 28-1 or 28-2 and/or driver that actually fetches the CCWs and IDAWs and transfers any data between mainstore 3-1 and the DASD 2 device over an ESCON or FICON channel link, as examples.

Figure 4B:
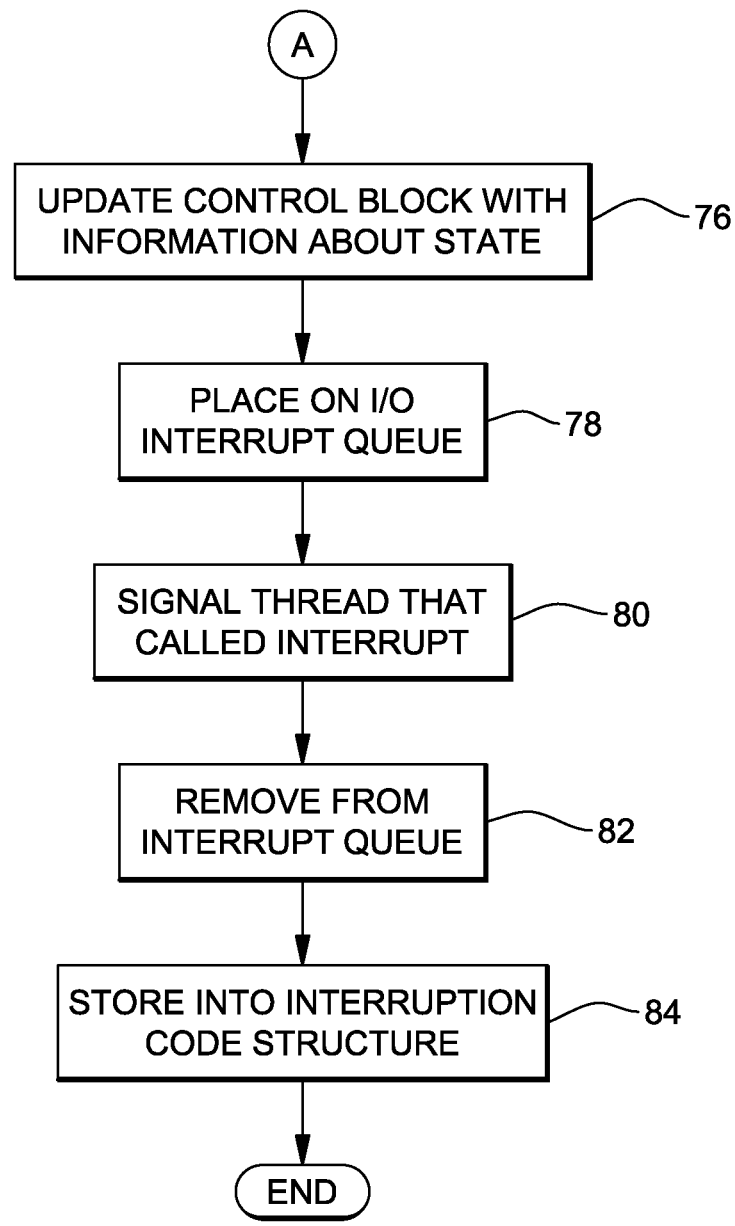

At the point when an I/O interrupt is presented, INQUIRY 74, the primary channel subsystem 5 updates the SCB 33 with information about the state of the I/O operation, STEP 76 (FIG. 4B). The primary channel subsystem 5 then places the subchannel number and interruption parameter on an I/O interrupt queue in HSA 3-2, STEP 78, and signals the thread that called the TestPendingInterruption function, STEP 80. This signaling may be performed by various mechanisms, such as by semaphore, inter-process communication message, inter-processor interrupt, etc. In the example herein, a semaphore is used. This is a different semaphore from the one used to signal the controller that a StartSubchannel has been issued.

When the semaphore is posted by the primary channel subsystem 5, the thread that is blocked performing the TestPendingInterruption function wakes up, removes the subchannel number and interruption parameter from the I/O interrupt queue, STEP 82, and stores them into the interruption code structure indicated at the time the TestPendingInterruption function was called, STEP 84.

Subsequent to completing the TestPendingInterruption, the application that called the StartSubchannel function, another application or the thread that initiated the TestPendingInterruption obtains an indication that it is complete, and initiates a TestSubchannel function, via the API, to determine the status of the I/O operation that was previously initiated by the StartSubchannel function.

Described in detail above is a technique for initiating and completing an I/O function, such as StartSubchannel. As indicated, other functions, such as HaltSubchannel, Clear- Subchannel and others may also be similarly processed. Other functions may also be similarly processed, but without going to the channel subsystem. These functions include, for instance, TestSubchannel, StoreSubchannel, ModifySubchannel, as well as others. With these functions, the processing remains in the API and those steps after INQUIRY 58 are not performed.

One example of the use of the I/O API 26 to perform an I/O operation is described below. In this example, no separate thread interrupt handler is provided.

EXAMPLE 1

```
Int main(int argc, char *argv[ ])
{
    int     rc;
    sid_t   sid;
    schib_t schib = {0};
    int     ccw_address;
    int     data_address;
    ccw_t   ccw;
    orb_t   orb;
    irb_t   irb;
    interrupt_code_t interrupt_code;
    uint8_t data;
    //-------------------------------------
    // Setup-Performed One Time at initialization
    //-------------------------------------
    // Get access to I/O API
    rc = init_io_api_access ( );
    if ( rc ) exit(EXIT_FAILURE);
    // Set up the sid
    sid.b0001 = 0x0001;
    sid.schnum = SUBCHANNEL_NUMBER;
    // Enable the subchannel
    rc = StoreSubchannel ( subchannel_id, &schib );
    if ( rc ) exit(EXIT_FAILURE);
    schib.pmcw.envalid |= 0x80;
    rc = ModifySubchannel ( subchannel_id, &schib );
    if ( rc ) exit(EXIT_FAILURE);
    //-------------------------------------
    // Perform an I/O operation
    //-------------------------------------
    // Identify the CCW area and a data area somewhere in mainstore 3-1
    ccw_address = 0x100;
    data_address = 0x1000;
    // Prepare a CCW (NOP)
    ccw.word0.fields.command = 0x02;    // Basic read opcode
    ccw.word0.fields.flags   = 0x00;    // No chaining, no SLI, no PCI, no skip, no IDA, no suspend
    ccw.word0.fields.count   = bswap_16(0x0001);    // One byte to transfer
    ccw.address              = bswap_32(data_address);   // Where to store the data
    // Put the CCW into mainstore 3-1
    rc = ms_store (IO_API_PARTITION_INDEX, ccw_address, (unsigned char *)&ccw, sizeof(ccw_t));
    if ( rc ) exit(EXIT_FAILURE);
    // Prepare the ORB
    memset(&orb, 0, sizeof(orb_t));
    orb.word1.bits.f = 1; // Use Format 1 CCW
    orb.ccw_address = ccw_address;
    orb.word1.lpm = 0xFF;
    // Start the I/O operation
    rc = StartSubchannel (sid, &orb);
    if ( rc ) exit(EXIT_FAILURE);
    // Could do other stuff here...
    // Wait for an I/O interrupt from the subchannel
    rc = TestPendingInterruption (&interrupt_code, 0xFF000000, 1);
    if ( rc != 1 ) exit(EXIT_FAILURE);
    if ( interrupt_code.sid.word != sid.word ) exit(EXIT_FAILURE);
    // Get the status
    rc = TestSubchannel (sid, &irb);
    if ( rc ) exit(EXIT_FAILURE);
    // Check the status
    if ( irb.scsw.keyslcc & scDFCC )   exit(EXIT_FAILURE);
    if ( irb.scsw.ctl & scALRT )       exit(EXIT_FAILURE);
    if ( irb.scsw.devstat != (sCE|sDE) ) exit(EXIT_FAILURE);
    if ( irb.scsw.schstat != 0x00 )    exit(EXIT_FAILURE);
    // I/O operation has completed successfully, access data from mainstore 3-1
    rc = ms_fetch (IO_API_PARTITION_INDEX, data_address, (unsigned char *)&data, 1);
    if ( rc ) exit(EXIT_FAILURE);
}
```

Another example of the use of the I/O API 26 to perform an I/O operation is described below. In this example, a separate thread interrupt handler is used to receive I/O interrupts.

EXAMPLE 2

```
// Global variable for communication between the interrupt handler thread
and main program
volatile int complete;
int main(int argc, char *argv[ ])
{
    int     rc;
    sid_t   sid;
    schib_t schib = {0};
    int     ccw_address;
    int     data_address;
    ccw_t   ccw;
    orb_t   orb;
    irb_t   irb;
    uint8_t data;
    pthread_t thread_id;
    //-------------------------------------
    // Setup
    //-------------------------------------
    // Get access to I/O API
    rc = init_io_api_access ( );
    if ( rc ) exit(EXIT_FAILURE);
    // Start the interrupt handler thread
    rc = pthread_create(&thread_id, NULL,
    interrupt_handler_thread, NULL);
    if ( rc ) exit(EXIT_FAILURE);
    // Set up the sid
    sid.b0001 = 0x0001;
    sid.schnum = SUBCHANNEL_NUMBER;
    // Enable the subchannel
    rc = StoreSubchannel ( subchannel_id, &schib );
    if ( rc ) exit(EXIT_FAILURE);
    schib.pmcw.envalid |= 0x80;
    rc = ModifySubchannel ( subchannel_id, &schib );
    if ( rc ) exit(EXIT_FAILURE);
    //-------------------------------------
    // Perform an I/O operation
    //-------------------------------------
    // Identify the CCW area and a data area somewhere in mainstore
    ccw_address = 0x100;
    data_address = 0x1000;
    // Prepare a CCW (NOP)
    ccw.word0.fields.command = 0x02;    // Basic read opcode
    ccw.word0.fields.flags   = 0x00;    // No chaining, no SLI, no PCI, no skip, no IDA, no suspend
    ccw.word0.fields.count   = bswap_16(0x0001);    // One byte to transfer
    ccw.address              = bswap_32(data_address);   // Where to store the data
    // Put the CCW into mainstore
    rc = ms_store (IO_API_PARTITION_INDEX, ccw_address, (unsigned char *)&ccw, sizeof(ccw_t));
    if ( rc ) exit(EXIT_FAILURE);
    // Prepare the ORB
    memset(&orb, 0, sizeof(orb_t));
    orb.word1.bits.f = 1; // Use Format 1 CCW
    orb.ccw_address = ccw_address;
    orb.word1.lpm = 0xFF;
    // Prepare completion indicator
    complete = 0;
```

```
        // Start the I/O operation
        rc = StartSubchannel (sid, &orb);
        if ( rc ) exit(EXIT_FAILURE);
        // Can do other stuff here...
        // Wait for indication that the operation has completed
        while ( !complete ) sleep(1);
        // Get the status
        rc = TestSubchannel (sid, &irb);
        if ( rc ) exit(EXIT_FAILURE);
        // Check the status
        if ( irb.scsw.keyslcc & scDFCC )   exit(EXIT_FAILURE);
        if ( irb.scsw.ctl & scALRT )       exit(EXIT_FAILURE);
        if ( irb.scsw.devstat != (sCE|sDE) ) exit(EXIT_FAILURE);
        if ( irb.scsw.schstat != 0x00 )    exit(EXIT_FAILURE);
        // I/O operation has completed successfully, access data from
        mainstore
        rc = ms_fetch (IO_API_PARTITION_INDEX, data_address,
(unsigned char *)&data, 1);
        if ( rc ) exit(EXIT_FAILURE);
}
//------------------------------------
// Interrupt Handler Thread
//------------------------------------
void interrupt_handler_thread(void *arg)
{
        int rc;
        sid_t sid;
        interrupt_code_t interrupt_code;
        // Set up the sid
        sid.b0001 = 0x0001;
        sid.schnum = SUBCHANNEL_NUMBER;
        // Loop to pick up all interrupts
        while ( 1 ) {
                // Wait for an I/O interrupt from the subchannel
                rc = TestPendingInterruption (&interrupt_code,
                0xFF000000, 1);
                if ( rc != 1) exit(EXIT_FAILURE);
                // Make sure the interrupt is from the expected subchannel
                if ( interrupt_code.sid.word == sid.word ) {
                        // Signal the application and continue to loop
                        complete = 1;
                        continue;
                }
                // Got an interrupt from an unexpected subchannel
                exit(EXIT_FAILURE);
        } // end of while loop
}
```

In the example below, a main startup process starts a separate thread interrupt handler.

EXAMPLE 3

```
//------------------------------------
// Header
//------------------------------------
typedef struct {
        sid_t sid;
        int complete;
} iocb_t;
//------------------------------------
// Main Routine (starts the interrupt handler thread)
//------------------------------------
int main(int argc, char *argv[ ])
{
        int    rc;
        pthread_t thread_id;
        //------------------------------------
        // Setup
        //------------------------------------
        // Get access to I/O API
        rc = init_io_api_access ( );
        if ( rc ) exit(EXIT_FAILURE);
        // Start the interrupt handler thread
        rc = pthread_create (&thread_id, NULL,
```

```
        interrupt_handler_thread, NULL);
        if ( rc ) exit(EXIT_FAILURE);
        // This process may do other things from here on ...
}
//------------------------------------
// Interrupt Handler Thread
//------------------------------------
void interrupt_handler_thread(void *arg)
{
        int rc;
        int iocb_address;
        iocb_t iocb;
        interrupt_code_t interrupt_code;
        // Loop to pick up all interrupts
        while ( 1 ) {
                // Wait for an I/O interrupt from the subchannel
                rc = TestPendingInterruption
                (&interrupt_code, 0xFF000000, 1);
                if ( rc != 1) exit(EXIT_FAILURE);
                // IOCB address is returned in interruption parameter
                iocb_address = interrupt_code.iparm;
                // Get the IOCB
                rc = ms_fetch (IO_API_PARTITION_INDEX, iocb_address,
(unsigned char *)&iocb, sizeof(iocb_t));
                if ( rc ) exit(EXIT_FAILURE);
                // Verify the interrupt is from the expected subchannel
                if ( interrupt_code.sid.word != iocb.sid )
                exit(EXIT_FAILURE);
                // Set the completion indicator in the IOCB to signal the
initiating application
                iocb.complete = 1;
                rc = ms_store (IO_API_PARTITION_INDEX, iocb_address,
(unsigned char *)&iocb, sizeof(iocb_t));
                if ( rc ) exit(EXIT_FAILURE);
        } // end of while loop
}
```

In the below example, an application or I/O process issues the I/O operation. In this example, the interrupt thread started by the program of Example 3 is utilized.

EXAMPLE 4

```
//------------------------------------
// Header
//------------------------------------
typedef struct {
        sid_t sid;
        int complete;
} iocb_t;
//------------------------------------
// Main Routine (initiates an I/O operation)
//------------------------------------
int main(int argc, char *argv[ ])
{
        int    rc;
        sid_t  sid;
        schib_t schib = {0};
        int    iocb_address;
        int    ccw_address;
        int    data_address;
        iocb_t iocb;
        ccw_t  ccw;
        orb_t  orb;
        irb_t  irb;
        uint8_t data;
        //------------------------------------
        // Setup
        //------------------------------------
        // Get access to I/O API
        rc = init_io_api_access ( );
        if ( rc ) exit(EXIT_FAILURE);
        // Set up the sid
        sid.b0001 = 0x0001;
        sid.schnum = SUBCHANNEL_NUMBER;
```

-continued

```
    // Allocate an IOCB in mainstore for this process
    iocb_address = ms_alloc(sizeof(iocb_t));
    if ( iocb_address == 0 ) exit(EXIT_FAILURE);
    // Enable the subchannel
    rc = StoreSubchannel ( subchannel_id, &schib );
    if ( rc ) exit(EXIT_FAILURE);
    schib.pmcw.envalidl |= 0x80;
    rc = ModifySubchannel ( subchannel_id, &schib );
    if ( rc ) exit(EXIT_FAILURE);
    //-------------------------------------
    // Perform an I/O operation
    //-------------------------------------
    // Identify the CCW area and a data area somewhere in mainstore
    ccw_address = 0x100;
    data_address = 0x1000;
    // Prepare a CCW (NOP)
    ccw.word0.fields.command = 0x02;      // Basic read opcode
    ccw.word0.fields.flags   = 0x00;      // No chaining, no SLI, no
PCI, no skip, no IDA, no suspend
    ccw.word0.fields.count   = bswap_16(0x0001);     // One byte
to transfer
    ccw.address              = bswap_32(data_address);  // Where to store
the data
    // Put the CCW into mainstore
    rc = ms_store (IO_API_PARTITION_INDEX, ccw_address,
(unsigned char *)&ccw, sizeof(ccw_t));
    if ( rc ) exit(EXIT_FAILURE);
    // Prepare the ORB
    memset(&orb, 0, sizeof(orb_t));
    orb.iparm = iocb_address; // The IOCB address will be returned later
in the interrupt code
    orb.word1.bits.f = 1;     // Use Format 1 CCW
    orb.ccw_address = ccw_address;
    orb.word1.lpm = 0xFF;
    // Prepare the IOCB in mainstore
    iocb.sid = sid;
    iocb.complete = 0;
    rc = ms_store (IO_API_PARTITION_INDEX, iocb_address,
(unsigned char *)&iocb, sizeof(iocb_t));
    if ( rc ) exit(EXIT_FAILURE);
    // Start the I/O operation
    rc = StartSubchannel (sid, &orb);
    if ( rc ) exit(EXIT_FAILURE);
    // Can do other stuff here...
    // Wait for indication that the operation has completed
    while ( 1 ) {
        rc = ms_fetch (IO_API_PARTITION_INDEX, iocb_address,
(unsigned char *)&iocb, sizeof(iocb_t));
        if ( rc ) exit(EXIT_FAILURE);
        if ( iocb.complete ) break;
        sleep(1);
    }
    // Get the status
    rc = TestSubchannel (sid, &irb);
    if ( rc ) exit(EXIT_FAILURE);
    // Check the status
    if ( irb.scsw.keyslcc & scDFCC )  exit(EXIT_FAILURE);
    if ( irb.scsw.ctl & scALRT )      exit(EXIT_FAILURE);
    if ( irb.scsw.devstat != (sCE|sDE) ) exit(EXIT_FAILURE);
    if ( irb.scsw.schstat != 0x00)    exit(EXIT_FAILURE);
    // I/O operation has completed successfully, access data from
    mainstore
    rc = ms_fetch (IO_API_PARTITION_INDEX, data_address,
(unsigned char *)&data, 1);
    if ( rc ) exit(EXIT_FAILURE);
}
```

Figure 5:
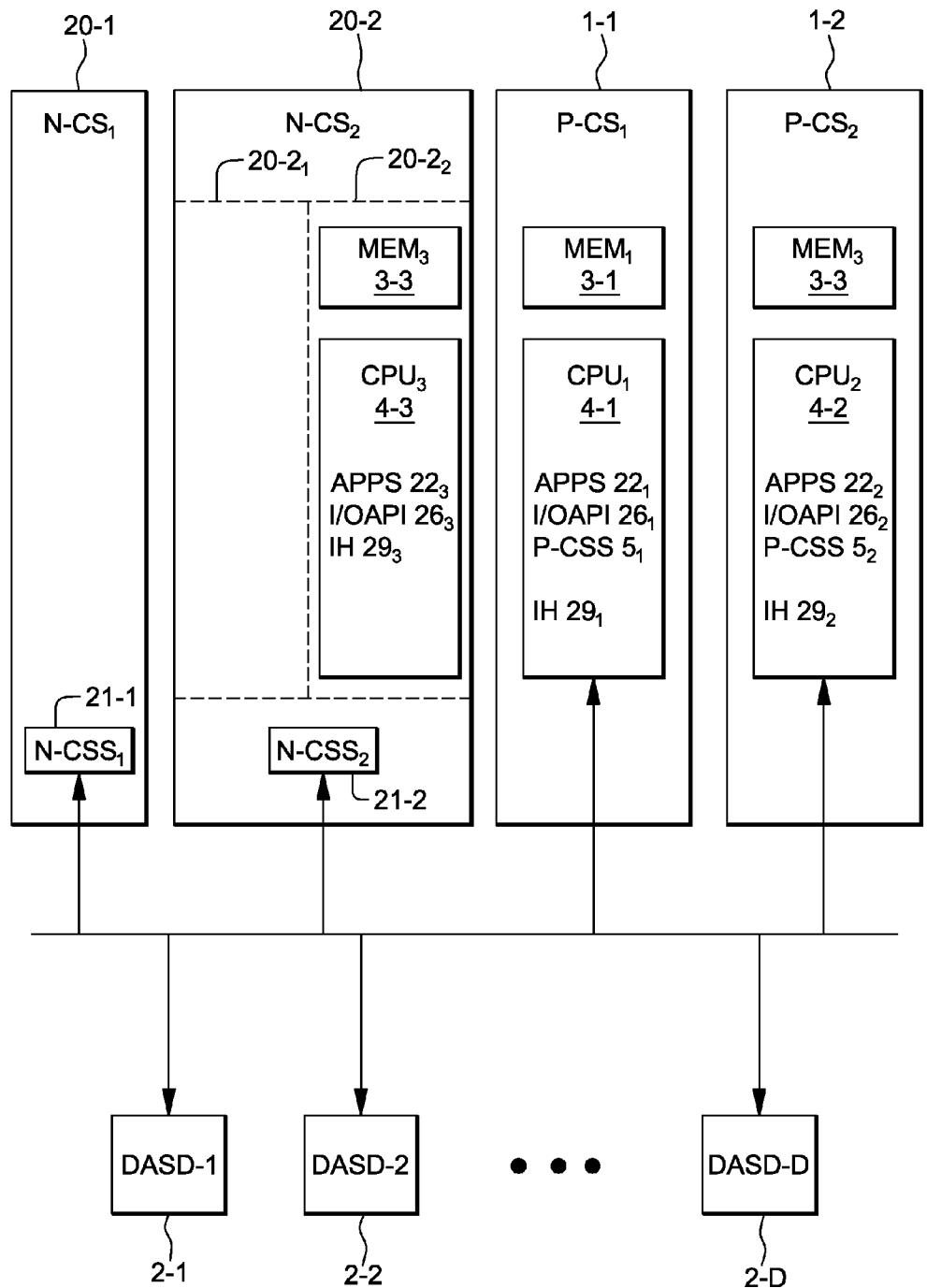
FIG. 5 depicts an array of computer systems including multiple native computer systems and multiple primary computer systems connected to multiple direct access storage device (DASDs), in accordance with an aspect of the present invention.

Referring to FIG. 5, an array of computer systems is provided that includes, for instance, native computer systems 20-1, 20-2 and primary computer systems 1-1 and 1-2 coupled to multiple direct access storage devices (DASDs), including DASDs 2-1, 2-2, . . . 2-D (where D is any integer). The computer systems are coupled together through channel-to-channel (CTC) networks. The native computer system 20-1 of FIG. 5 is analogous to the computer system 20 of FIG. 2, and the primary computer systems 1-1 and 1-2 of FIG. 5 are analogous to the computer system 1 of FIG. 2. The computer system 20-2 of FIG. 5 is a native computer system operating, for example, according to the z/Architecture®. In one example, the computer system 20-2 of FIG. 5 includes a partition 20-2$_1$ that is analogous to the computer system 20 of FIG. 2 and includes a partition 20-2$_2$ that is analogous to the computer system 1 of FIG. 2. The array of FIG. 5 is one example and the array can include any number of native and primary computer systems and can include any number of partitions with native and primary computer systems.

In FIG. 5, the native computer system 20-1 (N-CS$_1$) includes a native channel subsystem 21-1 (N-CSS$_1$) that communicates with the direct access storage devices (DASDs), including DASDs 2-1, 2-2, . . . 2-D according, in one embodiment, to the requirements of an IBM® mainframe computer and according to the requirements of the z/Architecture®.

The native computer system 20-2 (N-CS$_2$) includes a partition 20-2$_1$ that connects through the native channel subsystem 21-2 (N-CSS$_2$) for communication with the direct access storage devices (DASDs), including, for instance, DASDs 2-1, 2-2, . . . 2-D according, in one embodiment, to the requirements of an IBM® mainframe computer and according to the requirements of the z/Architecture®. The native computer system 20-2 (N-CS$_2$) also includes a partition 20-2$_2$ having the memory 3-3 and processor 4-3 (CPU$_3$) that connects through the native channel subsystem 21-2 (N-CSS$_2$) for communication with the direct access storage device (DASDs), including, for instance, DASDs 2-1, 2-2, . . . 2-D according, in one embodiment, to the requirements of an IBM® mainframe computer and according to the requirements of the z/Architecture®. The processor 4-3 executes instances of computer programs including primary applications 22$_3$, an application program interface 26$_3$, an interrupt handler 29$_3$ and other programs. These computer programs are executed using machine instructions of the primary processors 4-3.

The primary computer system 1-1 (P-CS$_1$) communicates with the direct access storage device (DASDs), including, for instance, DASDs 2-1, 2-2, . . . 2-D according, in one embodiment, to the requirements of an IBM® mainframe computer and according to the requirements of the z/Architecture®. The processor 4-1 executes instances of computer programs including primary applications 22$_1$, an application program interface 26$_1$, a primary channel subsystem 5$_1$, an interrupt handler 29$_1$ and other programs. These computer programs are executed using instructions of the primary processors 4-1.

The primary computer system 1-2 (P-CS$_2$) communicates with the direct access storage device (DASDs), including, for instance, DASDs 2-1, 2-2, . . . 2-D according, in one embodiment, to the requirements of an IBM® mainframe computer and according to the requirements of the z/Architecture®. The processor 4-2 executes instances of computer programs including primary applications 22$_2$, an application program interface 26$_2$, a primary channel subsystem 5$_2$, an interrupt handler 29$_2$ and other programs. These computer programs are executed using instructions of the primary processors 4-2.

In one example, native computer systems 20-1 and 20-2 are mainframe IBM® computers running operating systems, such as z/OS®; the primary computer 1-1 is an Intel® Itanium (IA-64) computer system running a Unix operating system, and primary computer 1-2 as an Intel x86_64 computer system running a Windows® Operating system. As a further example, the partition 20-2$_2$ in the computer system 20-2 is operating with a Linux operating system.

Described in detail above is an application program interface used to enable primary computer systems to directly access devices of a native computer system. The application program interface includes library functions that provide the effect of the z/Architecture® I/O instructions. In one example, the functions communicate with an I/O subsystem, such as a channel subsystem, implemented on the host operating system of the primary platform. This enables access to data on mainframe-attached storage and other peripheral devices without requiring the mainframe or the mainframe operating system. The various features of the channel subsystem, including, but not limited to, multiple paths to devices, dynamic reconnect support, certain I/O-related measurements, mainframe-style configuration support, etc, are available. Application programs running on the host operating system can use the API to cause the channel subsystem (or other I/O subsystem) to access data stored on native compatible storage and other peripheral devices attached to the channels (e.g., ESCON or FICON channels). The application program interface can also be used to provide status of the channel subsystem and perform various other functions.

With use of the API and interrupt handling, an I/O operation may be started on an application thread or process and before that completes, one or more other operations may be initiated and/or executed on that same application thread or process.

In one particular embodiment, dynamic path selection is supported. That is, the channel subsystem can initiate an I/O operation along one of a number of channels to a device. This has performance and RAS benefits.

Additionally, dynamic reconnect is supported, in which an I/O operation is started on one channel to a device and if the device disconnects, it can reconnect and continue operation on another channel path. This has performance and RAS benefits. If a device has multiple channel paths along which to reconnect, it can choose one that is not busy. Also, because there are multiple channel paths to reconnect over, if one path is not functional for some reason, it can choose one of the remaining paths.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
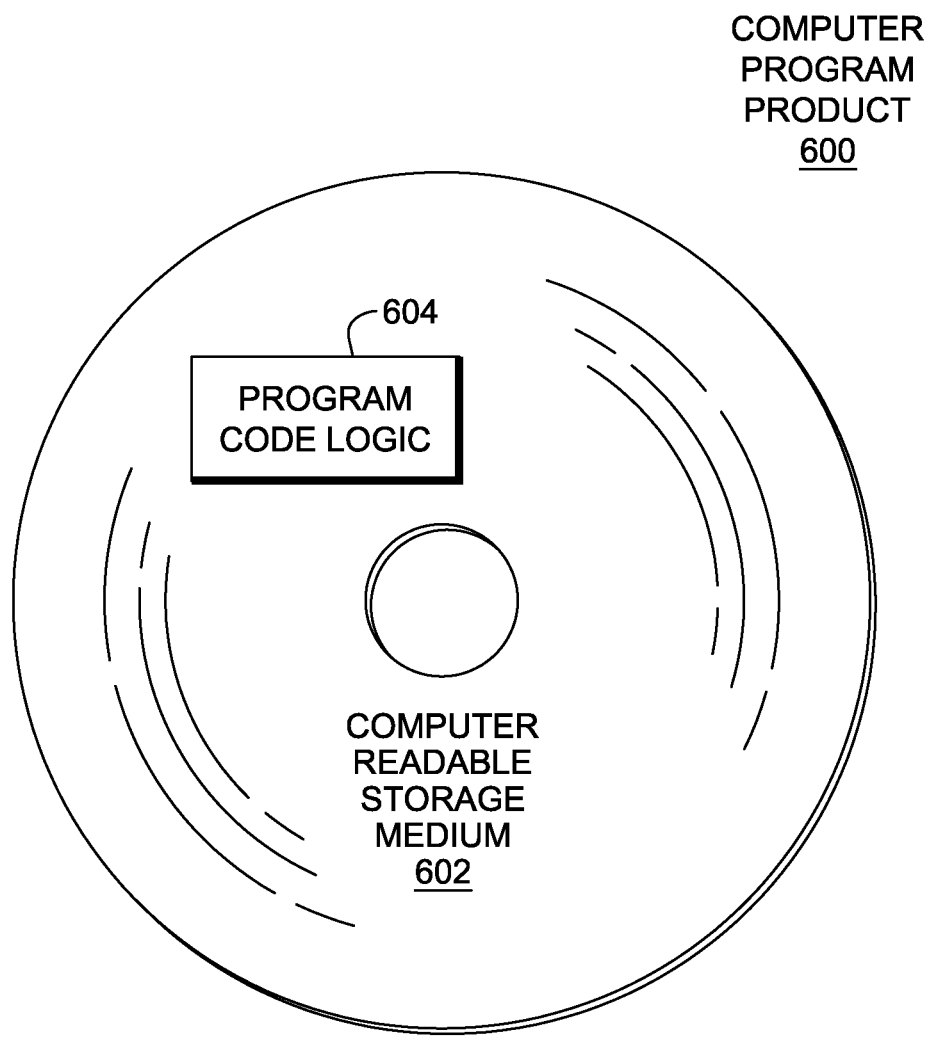
FIG. 6 depicts one embodiment of a computer program product incorporating one or more aspects of the present invention.

Referring now to FIG. 6, in one example, a computer program product 600 includes, for instance, one or more computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, subsystems other than channel subsystems, such as other I/O subsystems, may use one or more aspects of the present invention. Further, constructs other than CCWs, such as DCWs (Device Command Words), or others may be used. Moreover, information included in the various control blocks or even the control blocks themselves can differ from those described herein. Further, each of the functions may include more, less or different arguments, parameter and/or attributes. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating access to input/output (I/O) devices of a computing environment, the computer program product comprising:
a non-transitory computer readable storage medium readable by a processing circuit and storing instructions for execution by the processing circuit for performing a method comprising:
processing, by an application program interface executing on a processor of a first computer system operating according to a first system architecture, an I/O operation requested by an application of the first computer system to access an I/O device operating according to a second system architecture, the second system architecture different from the first system architecture, wherein the first system architecture has a first machine instruction set different from a second machine instruction set of the second system architecture, said processing providing an I/O request, and wherein the application program interface executing on the processor of the first computer system operating according to the first system architecture includes one or more library functions to implement functionality of one or more I/O instructions of the second system architecture to provide access to the I/O device;
wherein, based on invoking the one or more library functions of the application program interface, the application program interface provides information about the I/O operation to a subsystem operating according to the second system architecture to access the I/O device operating according to the second system architecture, and wherein the method further comprises accessing the I/O device by the subsystem, wherein the subsystem comprises a channel subsystem executing an instruction set of the second system architecture; and
obtaining by the application program interface an interrupt for the I/O device accessed based on the I/O request, the interrupt to indicate completion of the I/O operation.

2. The computer program product of claim 1, wherein the method further comprises accessing the I/O device by a subsystem of the first computing system, the subsystem coupled to the application program interface, and the subsystem comprising a channel subsystem executing an instruction set of the first system architecture.

3. The computer program product of claim 1, wherein the method further comprises:
obtaining by a subsystem coupled to the application program interface the I/O request, based on an indication by the application program interface that the I/O request is available for processing by the subsystem;
processing by the subsystem, based on the obtaining, the I/O request to access the I/O device;
providing by the subsystem information relating to the processing of the I/O device on an interrupt queue, based on completion of the access to the I/O device; and
providing an indication that the information is on the interrupt queue.

4. The computer program product of claim 3, wherein the processing the I/O request by the subsystem comprises:
selecting a channel path from a plurality of channel paths to be used to access the I/O device; and
providing information relating to the I/O request to the selected channel path.

5. The computer program product of claim 4, wherein the method further comprises passing the I/O request from the selected channel path to a device to access the I/O device.

6. The computer program product of claim 1, wherein the I/O device is coupled to the first computer system and a second computer system of the second system architecture.

7. The computer program product of claim 1, wherein the I/O device is coupled to a second computer system operating according to the second system architecture, and wherein the second computer system includes a partition and wherein the processor operating according to the first system architecture operates in the partition.

8. The computer program product of claim 1, wherein the processor further includes a thread formed of primary instructions for execution by the processor for receiving the interrupt from the application program interface.

9. The computer program product of claim 1, wherein the application program interface is formed of primary instructions, and wherein the processor includes a program for starting a thread formed of primary instructions for execution by the processor for receiving the interrupt from the application program interface.

10. The computer program product of claim 1, wherein the application program interface is formed of primary instructions, and wherein the processor includes a first program formed of primary instructions and includes a second program formed of primary instructions, wherein the second program is separately initialized for providing a thread formed of primary instructions for execution by the processor for receiving the interrupt from the application program interface.

11. The computer program product of claim 1, wherein the first system architecture comprises a first hardware computer architecture and the second system architecture comprises a second hardware computer architecture different from the first hardware computer architecture.

12. The computer program product of claim 1, wherein the first system architecture comprises a non-mainframe architecture and the second system architecture comprises a mainframe architecture.

13. A computer system for facilitating access to input/output (I/O) devices of a computing environment, the computer system comprising:
a memory; and
a processor in communications with the memory, wherein the computer system is configured to perform a method, said method comprising:
processing, by an application program interface executing on a processor of a first computer system operating according to a first system architecture, an I/O operation requested by an application of the first computer system to access an I/O device operating according to a second system architecture, the second system architecture different from the first system architecture, wherein the first system architecture has a first machine instruction set different from a second machine instruction set of the second system architecture, said processing providing an I/O request, and wherein the application program interface executing on the processor of the first computer system operating according to the first system architecture includes one or more library functions to implement functionality of one or more I/O instructions of the second system architecture to provide access to the I/O device;

wherein, based on invoking the one or more library functions of the application program interface, the application program interface provides information about the I/O operation to a subsystem operating according to the second system architecture to access the I/O device operating according to the second system architecture, and wherein the method further comprises accessing the I/O device by the subsystem, wherein the subsystem comprises a channel subsystem executing an instruction set of the second system architecture; and obtaining by the application program interface an interrupt for the I/O device accessed based on the I/O request, the interrupt to indicate completion of the I/O operation.

14. The computer system of claim 13, wherein the method further comprises:

obtaining by a subsystem coupled to the application program interface the I/O request, based on an indication by the application program interface that the I/O request is available for processing by the subsystem;

processing by the subsystem, based on the obtaining, the I/O request to access the I/O device;

providing by the subsystem information relating to the processing of the I/O device on an interrupt queue, based on completion of the access to the I/O device; and providing an indication that the information is on the interrupt queue.

15. The computer system of claim 14, wherein the processing the I/O request by the subsystem comprises:

selecting a channel path from a plurality of channel paths to be used to access the I/O device; and providing information relating to the I/O request to the selected channel path.

16. The computer system of claim 13, wherein the I/O device is coupled to a second computer system operating according to the second system architecture, and wherein the second computer system includes a partition and wherein the processor operating according to the first system architecture operates in the partition.

17. The computer system of claim 13, wherein the processor further includes a thread formed of primary instructions for execution by the processor for receiving the interrupt from the application program interface.

18. The computer system of claim 13, wherein the application program interface is formed of primary instructions, and wherein the processor includes a first program formed of primary instructions and includes a second program formed of primary instructions, wherein the second program is separately initialized for providing a thread formed of primary instructions for execution by the processor for receiving the interrupt from the application program interface.

19. A method of facilitating access to input/output (I/O) devices of a computing environment, said method comprising:

processing, by an application program interface executing on a processor of a first computer system operating according to a first system architecture, an I/O operation requested by an application of the first computer system to access an I/O device operating according to a second system architecture, the second system architecture different from the first system architecture, wherein the first system architecture has a first machine instruction set different from a second machine instruction set of the second system architecture, said processing providing an I/O request, and wherein the application program interface executing on the processor of the first computer system operating according to the first system architecture includes one or more library functions to implement functionality of one or more I/O instructions of the second system architecture to provide access to the I/O device;

wherein, based on invoking the one or more library functions of the application program interface, the application program interface provides information about the I/O operation to a subsystem operating according to the second system architecture to access the I/O device operating according to the second system architecture, and wherein the method further comprises accessing the I/O device by the subsystem, wherein the subsystem comprises a channel subsystem executing an instruction set of the second system architecture; and obtaining by the application program interface an interrupt for the I/O device accessed based on the I/O request, the interrupt to indicate completion of the I/O operation.

20. The method of claim 19, further comprising:

obtaining by a subsystem coupled to the application program interface the I/O request, based on an indication by the application program interface that the I/O request is available for processing by the subsystem;

processing by the subsystem, based on the obtaining, the I/O request to access the I/O device;

providing by the subsystem information relating to the processing of the I/O device on an interrupt queue, based on completion of the access to the I/O device; and providing an indication that the information is on the interrupt queue.

21. The method of claim 20, wherein the processing the I/O request by the subsystem comprises:

selecting a channel path from a plurality of channel paths to be used to access the I/O device; and providing information relating to the I/O request to the selected channel path.

* * * * *